(12) United States Patent
Wu et al.

(10) Patent No.: US 9,313,035 B2
(45) Date of Patent: Apr. 12, 2016

(54) CHARGING COUNT METHOD AND DEVICE

(75) Inventors: Wenfu Wu, Shanghai (CN); Jin Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 835 days.

(21) Appl. No.: 13/350,422

(22) Filed: Jan. 13, 2012

(65) Prior Publication Data

US 2012/0113855 A1    May 10, 2012

Related U.S. Application Data

(63) Continuation of application No. PCT/CN2010/075204, filed on Jul. 16, 2010.

(30) Foreign Application Priority Data

Jul. 16, 2009    (CN) .......................... 2009 1 0150192

(51) Int. Cl.
   *G01R 31/08*    (2006.01)
   *H04L 12/14*    (2006.01)

(52) U.S. Cl.
   CPC ............ *H04L 12/14* (2013.01); *H04L 12/1403* (2013.01); *H04L 12/1407* (2013.01); *H04L 12/1471* (2013.01)

(58) Field of Classification Search
   CPC .................................................... H04W 72/04
   USPC .................. 370/241–254, 328–339; 709/226
   See application file for complete search history.

(56) References Cited

U.S. PATENT DOCUMENTS

| | | | |
|---|---|---|---|
| 8,706,080 B2 * | 4/2014 | Yang et al. ................. | 455/406 |
| 2002/0127995 A1 | 9/2002 | Faccinn et al. | |
| 2003/0232615 A1 | 12/2003 | Kim et al. | |
| 2004/0267645 A1 * | 12/2004 | Pollari ................. | G06F 21/10 705/34 |
| 2005/0048950 A1 | 3/2005 | Morper | |
| 2006/0090074 A1 * | 4/2006 | Matoba ................. | 713/171 |
| 2008/0160957 A1 | 7/2008 | Ono | |
| 2009/0088129 A1 * | 4/2009 | Cai et al. ................. | 455/406 |

(Continued)

FOREIGN PATENT DOCUMENTS

| | | |
|---|---|---|
| CN | 1575577 A | 2/2005 |
| CN | 1773919 A | 5/2006 |

(Continued)

OTHER PUBLICATIONS

Office Action and Search Report issued in corresponding Chinese Patent Application No. 200910150192.3, mailed Sep. 5, 2012.

(Continued)

*Primary Examiner* — Iqbal Zaidi
(74) *Attorney, Agent, or Firm* — Brinks Gilson & Lione

(57) ABSTRACT

A charging count method and a charging count device are provided. The method includes: acquiring an industry user identifier corresponding to a user equipment according to a user equipment identifier or an access point name APN used by the user equipment; and performing charging count on an industry user corresponding to the industry user identifier. Through the charging count method and the charging count device, charging processing of a charging count network element is optimized, thereby greatly reducing a charging processing load of the charging count network element, and ensuring normal operation of the charging count network element.

17 Claims, 6 Drawing Sheets

(56) References Cited

U.S. PATENT DOCUMENTS

| | | | |
|---|---|---|---|
| 2010/0008483 A1 | 1/2010 | Wang et al. | |
| 2011/0299395 A1* | 12/2011 | Mariblanca Nieves | H04L 12/5695 370/235 |
| 2012/0084425 A1* | 4/2012 | Riley | H04M 15/00 709/223 |

FOREIGN PATENT DOCUMENTS

| | | |
|---|---|---|
| CN | 101039364 A | 9/2007 |
| EP | 1515512 A2 | 3/2005 |
| EP | 1633123 A1 | 3/2006 |
| GB | 2450575 A | 12/2008 |
| JP | 2003-008638 A | 1/2003 |
| JP | 2003-134546 A | 5/2003 |
| JP | 2005-086770 | 3/2005 |
| KR | 20010055223 A | 7/2001 |
| WO | WO 2008122649 A2 | 10/2008 |

OTHER PUBLICATIONS

International Search Report and Written Opinion of the International Searching Authority issued in corresponding PCT Patent Application No. PCT/CN2010/075204, mailed Nov. 4, 2010.

Extended European Search Report issued in corresponding European Patent Application No. 10799441.0, mailed Mar. 28, 2012.

Office Action issued in corresponding Japanese Patent Application No. 2012-519877 (including English translation); mailed May 28, 2013.

Office Action issued in corresponding Chinese Patent Application No. 200910150192.3, mailed Feb. 22, 2013.

* cited by examiner

CHARGING COUNT METHOD AND DEVICE

CROSS-REFERENCE TO RELATED APPLICATIONS

This application is a continuation of International Application No. PCT/CN2010/075204, filed on Jul. 16, 2010, which claims priority to Chinese Patent Application No. 200910150192.3, filed on Jul. 16, 2009, both of which are hereby incorporated by reference in their entireties.

FIELD OF THE INVENTION

The present invention relates to field of charging, and in particular, to a charging count method and a charging count device.

BACKGROUND OF THE INVENTION

In a current charging system, a GGSN (gateway GPRS support node, Gateway GPRS Support Node) or a PDN GW (packet data network gateway, Packet Data Network Gateway, abbreviated as PGW) (referred to as GGSN/PDN GW hereinafter) performs; for each UE (User Equipment, user equipment), a bearer of each UE, or a flow granularity in each UE, charging measurement (Measurement), which may also be referred to as charging collect (collect) or referred to as charging count or account (count or account), for example, volume count, that is, volume based charging (Volume based charging); or duration count, that is, time based charging (Time based charging). Then, the GGSN/PDN GW notifies a charging system of charging count information, for example, a counted data traffic or counted time, that is, the GGSN/PDN GW generates a CDR (charging data record, Charging Data Record) which may also be referred to as a charging bill, and the GGSN/PDN GW notifies the charging system of the generated CDR.

MTC (machine type communication, Machine Type Communication) application refers to network communications implemented between one or more network elements or devices without human participation, that is, M2M (machine to machine, Machine to Machine) application, such as traffic control and management, plant monitoring, remote meter reading, and other applications. For the MTC application, an operator generally charges based on the granularity of an MTC User or an MTC Subscriber (MTC subscriber), and the MTC User or the MTC Subscriber may include multiple MTC Devices (MTC devices), that is, UEs. For example, for a meter reading service of electricity, the MTC Device is an electric meter, and the MTC User or the MTC Subscriber is a power company; and for a traffic control and management service, the MTC Device is a traffic monitoring device, and the MTC User or the MTC Subscriber is a traffic management department.

During the implementation of the present invention, the inventors find that the prior art at least has the following problems.

On one hand, according to a current charging processing mechanism, the GGSN/PDN GW generates a CDR for each MTC Device, and then the GGSN/PDN GW reports the CDR of each MTC Device to the charging system. However, the charging system cares the CDR of the MTC User or the MTC Subscriber, rather than the CDR of an individual MTC Device. Meanwhile, numerous MTC Devices exist, so that the generation of the CDR for each MTC Device greatly increases the processing load of the GGSN/PDN GW, causing the overload of the GGSN/PDN GW, and influencing the normal operation of the system.

On the other hand, for an enterprise network, an operator also performs charging based on the whole enterprise network, instead of charging an individual UE in the enterprise network. However, in the current charging processing mechanism, the GGSN/PDN GW generates a CDR for each UE in the enterprise network, and then the GGSN/PDN GW reports the CDR of each UE in the enterprise network to the charging system. However, the charging system cares the CDR of the whole enterprise network, rather than the CDR of each UE in the enterprise network. Meanwhile, numerous UEs exist in the enterprise network, so that the generation of the CDR for each UE in the enterprise network greatly increases the processing load of the GGSN/PDN GW, causing the overload of the GGSN/PDN GW, and influencing the normal operation of the system.

SUMMARY OF THE INVENTION

Embodiments of the present invention provide a charging count method and a charging count method device, so as to reduce a charging processing load of a charging count network element.

In one aspect, an embodiment of the present invention provides a charging count method, where the method includes: acquiring an industry user identifier corresponding to a UE according to a UE identifier or an access point name APN used by the UE; and performing charging count on an industry user corresponding to the industry user identifier.

In another aspect, an embodiment of the present invention further provides a charging count device, where the device includes: an acquiring unit, configured to acquire an industry user identifier corresponding to a UE according to a UE identifier or an access point name APN used by the UE; and a charging count unit, configured to perform charging count on an industry user corresponding to the industry user identifier.

Through the charging count method and the charging count device provided in embodiments of the present invention, charging processing of a charging count network element is optimized, thereby greatly reducing a charging processing load of a charging count network element, and ensuring normal operation of the charging count network element.

BRIEF DESCRIPTION OF THE DRAWINGS

The accompanying drawings described herein are provided for further understanding of the present invention, and forms a part of this application, rather than constitute limitations to the present invention. In the accompanying drawings.

DETAILED DESCRIPTION OF THE EMBODIMENTS

In order to make the objectives, technical solutions, and advantages of the present invention more comprehensible, the present invention is described in further detail below with reference to embodiments and the accompanying drawings. Herein, the schematic embodiments of the present invention and descriptions of the embodiments are intended to interpret the present invention, rather than limit the present invention.

Embodiment 1

An embodiment of the present invention provides a charging count method, and this embodiment is described in detail below with reference to an accompanying drawing.

Figure 1:
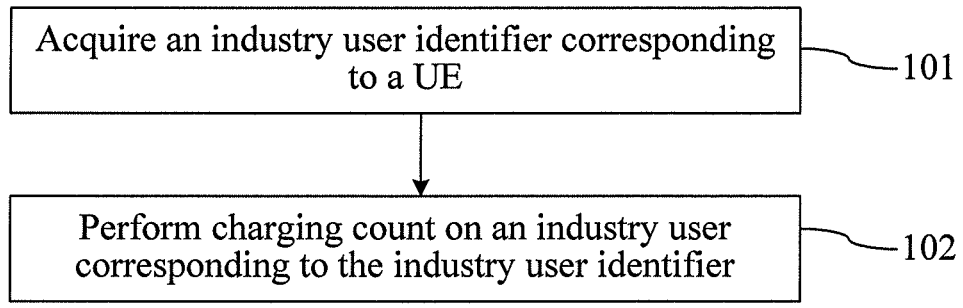
FIG. 1 is a flow chart of a method according to an embodiment of the present invention.

FIG. 1 is a flow chart of a method according to the embodiment. Referring to FIG. 1, the charging count method according to this embodiment includes:

101: acquire an industry user identifier corresponding to a UE according to a UE identifier or an access point name APN used by the UE; and

102: perform charging count on an industry user corresponding to the industry user identifier.

In the charging count method of this embodiment, only the industry user is charged, thereby greatly reducing a charging processing load in a charging count network element, and ensuring normal operation of the charging count network element.

Each of the steps in this embodiment may be implemented in different manners, which are described with reference to different embodiments.

Embodiment 2

An embodiment of the present invention further provides a charging count method, and this embodiment is described in detail below with reference to accompanying drawings.

Figure 2:
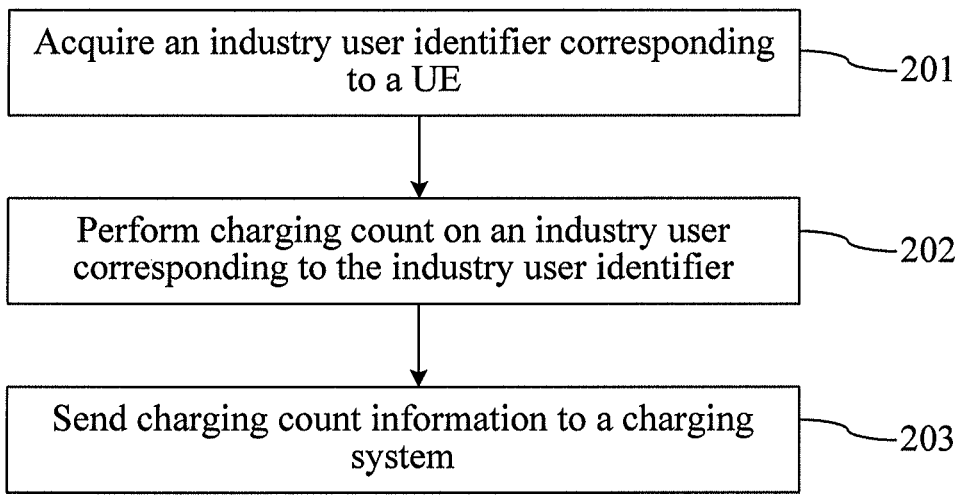
FIG. 2 is a flow chart of a method according to another embodiment of the present invention.

FIG. 2 is a flow chart of a method according to this embodiment of the present invention. Referring to FIG. 2, the method according to this embodiment includes the following steps:

201: Acquire an industry user identifier corresponding to a UE according to a UE identifier or an access point name APN used by the UE.

In this embodiment, the acquiring the industry user identifier corresponding to the UE may be implemented according to the UE identifier and a configured corresponding relation between the UE and an industry user, or implemented according to the access point name APN used by the UE and a configured corresponding relation between the APN and the industry user, and this embodiment is not limited thereto.

Figure 3A:
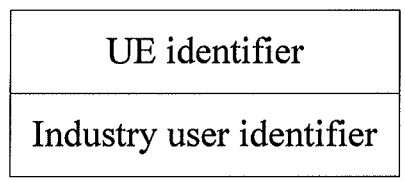
FIG. 3a is a schematic diagram of configuring an industry user corresponding to a UE in an embodiment of the present invention.
Figure 3B:
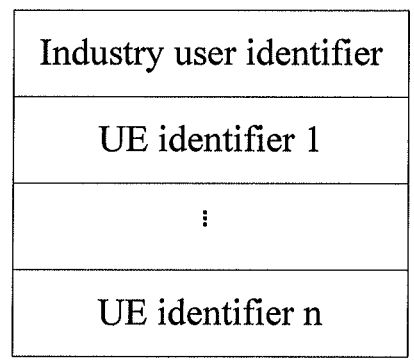
FIG. 3b is a schematic diagram of configuring a UE list used by an industry user in an embodiment of the present invention.
Figure 3C:
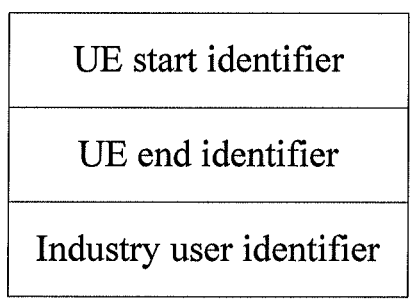
FIG. 3c is a schematic diagram of configuring an industry user corresponding to an identifier segment in an embodiment of the present invention.

If the industry user identifier corresponding to the UE is acquired according to the UE identifier and the configured corresponding relation between the UE and the industry user, configure the corresponding relation between the UE and the industry user first. For example, configure the industry user corresponding to the UE, as shown in FIG. 3a, configure an industry user identifier corresponding to each UE identifier; or configure a UE list used by the industry user, as shown in FIG. 3b, configure a UE identifier list used by the industry user identifier; or allocate an identifier segment to the UEs used by the industry user, for example, allocate an IMSI number segment from 460350789123000 to 460350789123999 to an industry user, and then configure an industry user corresponding to the identifier segment, as shown in FIG. 3c. Then, the industry user corresponding to the UE is acquired according to the received UE identifier and the configured corresponding relation between the UE and the industry user.

Figure 4:
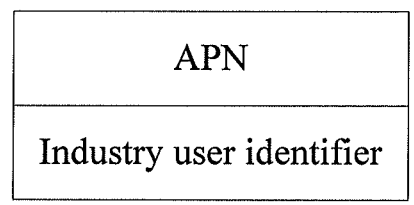
FIG. 4 is a schematic diagram of configuring correspondence between an APN and an industry user in an embodiment of the present invention.

If the industry user identifier corresponding to the UE is acquired according to the access point name APN used by the UE and the configured corresponding relation between the APN and the industry user, the corresponding relation between the APN and the industry user must be configured first, as shown in FIG. 4. For example, an industry user subscribes to a specific APN from an operator, and subscription data of a UE of the industry user in an HSS (home subscriberserver, Home Subscriber Server)/HLR (home location register, Home Location Register) includes the specific APN. In this embodiment, the industry user identifier corresponding to the specific APN is configured, that is, which industry user to use the specific APN is configured, then the industry user identifier corresponding to the UE can be acquired according to the specific APN according to the UE.

In this embodiment, the industry user is a logic entity, including enterprises (for example, power company), government departments (for example, traffic management department), or individuals. The enterprises, government departments, or individuals use multiple M2M devices or UEs to access a network of an operator. The industry user may include an MTC User, an MTC Subscriber, an enterprise network user, a user group user or a group user. For an MTC application, the UE is an MTC Device, and the industry user is an MTC User or an MTC Subscriber. Therefore, according to step 201 in this embodiment, the MTC User or the MTC Subscriber corresponding to the MTC Device needs to be acquired. For an enterprise network, according to step 201 in this embodiment, an enterprise network user corresponding to the UE in the enterprise network needs to be acquired. For a user group user or a group user, according to step 201 in this embodiment, a user group identifier or a group identifier needs to be acquired, where the user group identifier may also be described as a user group user identifier, and the group identifier may also be described as a group user identifier.

202: Perform charging count (Charging count) on the industry user corresponding to the industry user identifier.

If a count mode of a charging rule is volume count, perform volume charging count on the UEs of the industry user, combine volume charging information of the UEs, and generate volume charging information of the industry user; or if the count mode of the charging rule is duration count, perform duration charging count on the UEs of the industry user, combine duration charging information of the UEs, and generate duration charging information of the industry user.

If a charging method of the count rule is online charging, the volume charging information or the duration charging information of the industry user is sent to an online charging system; or if the count method of the count rule is offline charging, the volume charging information or the duration charging information of the industry user is sent to an offline charging system, where a message sent to the online charging system or the offline charging system includes a charging identifier of the charging rule.

In this embodiment, the performing of the charging count on the industry user includes performing charging count on the industry user, on a bearer of the industry user, or on a flow granularity of the industry user. The charging count may also be described as charging measurement or charging collect, and this embodiment is not limited thereto.

For example, if it is acquired, according to this embodiment, that a UE 1, . . . , and a UE n all belong to an industry user 1, charging information of the UE 1, . . . , and the UE n, bearers in the devices, or flows in the devices is counted in this embodiment. For example, the volume is counted or the duration is counted, and then the charging information is combined, so as to generate charging information of the industry user, the bearers of the industry user, or flows of the industry user.

For example, if the UE 1, the UE 2, and the UE 3 all belong to the industry user 1, according to this embodiment, the volume of the UE 1 is counted to be 100 M bytes, the volume of the UE 2 is counted to be 150 M bytes, and the volume of the UE 3 is counted to be 80 M bytes, the volume of the industry user 1 counted in this embodiment is 100+150+ 80=330 M bytes. The charging count performed based on the bearer granularity or the flow granularity of the industry user is similar, for example, if the volume of a flow 1 of the UE 1 is counted to be 50 M bytes, the volume of the flow 1 of the UE 2 is counted to be 40 M bytes, and the volume of the flow 1 of the UE 3 is counted to be 60 M bytes, the volume of the flow 1 of the industry user 1 counted in this embodiment is 50+40+60=150 M bytes, and details are not repeated herein again.

Through the charging on the industry user only, a charging processing load in a charging count network element is greatly reduced, so as to ensure normal operation of the charging count network element.

Furthermore, the method according to this embodiment further includes:

203: send charging count information to a charging system.

The charging count information includes: an industry user identifier, a charging identifier used by the industry user, and charging information of the industry user; or the charging identifier used by the industry user and the charging information of the industry user.

In this embodiment, the charging system may also be referred to as a billing system (Billing System).

According to this embodiment, the charging information of the industry user acquired in step 202 is notified to the charging system through a message such as a credit request (Credit Request), an online charging request (Online Charging Request), a data record transfer request (Data Record Transfer Request), a charging data request (Charging Data Request), or an accounting request (Accounting Request), or in a charging data record (CDR, Charging Data Record) or a charging event (Charging Event).

For example, according to this embodiment, a CDR which is also referred to as a bill (Bill) is generated for the industry user, the bearers of the industry user or the flow granularities of the industry user, where the CDR includes the charging information counted in step 202, and the generated CDR is notified to the charging system through messages such as credit request.

It should be noted that in this embodiment, the UE identifier includes, for example, an IMSI (International Mobile Subscriber Identity, international mobile subscriber identity), an MSISDN (Mobile Station International ISDN Number, mobile station international ISDN number), or an IMEI (International Mobile Equipment Identity, international mobile equipment identity) of the UE; and the industry user identifier includes, for example, an IMSI, an MSISDN, or an IMEI of the industry user, and the industry user identifier is an MTC User identifier, an MTC Subscriber identifier, an enterprise network user identifier, a user group user identifier, or a group user identifier.

It should be noted that in this embodiment, the charging system may be, for example, an online charging system (Online Charging System, OCS), an offline charging system (Offline Charging System, OFCS), a customized applications for mobile network enhanced logic (Customized Applications for Mobile network Enhanced Logic, CAMEL) system, a charging data function (Charging Data Function) system, a charging gateway function (Charging Gateway Function, CGF) system, or a charging gateway (Charging Gateway, CG).

The method according to the embodiment may be applied to a charging count network element such as a GGSN or a PGW.

By using the method according to this embodiment, the charging processing based on the granularity of the industry user, the bearer granularity of the industry user, or the flow granularity of the industry user can be implemented only through the modification processing on the GGSN or the PGW (which may include a PCRF), without modifying devices such as the charging system and a core management network element, thereby greatly reducing the processing load of the GGSN/PGW, and ensuring the normal operation of the GGSN/PGW. Furthermore, the charging count information based on the industry user is sent to the charging system, so that the processing load of the charging system is greatly reduced, and the charging signaling volume between the GGSN/PGW and the charging system is also reduced. Moreover, the operator can implement the charging processing based on the granularity of the industry user, the bearer granularity of the industry user, or the flow granularity of the industry user only by upgrading the GGSN/PGW devices in the present network or deploying the GGSN/PGW used by the industry user, thereby greatly reducing the investment of the operator, and effectively protecting the investment of the operator.

In order to make the method of this embodiment more comprehensible, the method of this embodiment is described below with reference to a schematic diagram of PCC architecture, and a flow chart of information exchange of network elements under the PCC architecture.

Figure 5:
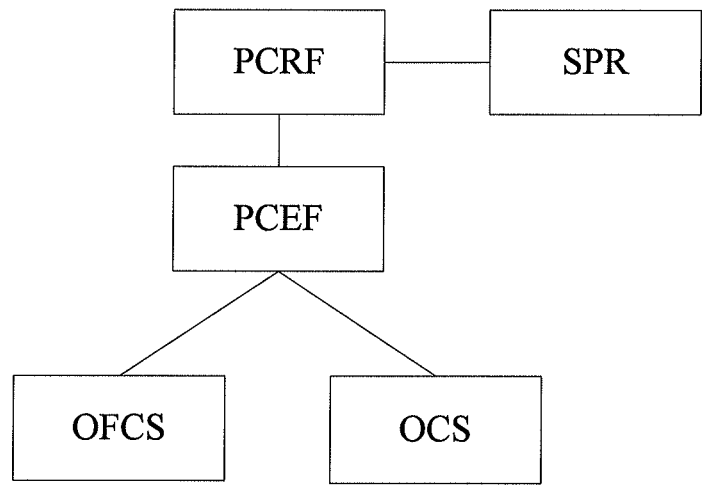
FIG. 5 is a schematic diagram of policy and charging control (PCC) architecture.

FIG. 5 is a schematic diagram of PCC (Policy and Charging Control, policy and charging control) architecture, where a PCRF (Policy Control and Charging Rules Function, policy control and charging rules function) network element mainly implements functions such as policy control determination and flow based charging control; a PCEF (Policy and Charging Enforcement Function, policy and charging enforcement function) network element mainly implements functions such as service data stream detection, policy enforcement and flow based charging, and mainly includes network elements such as a GGSN (Gateway GPRS Support Node, gateway GPRS support node) or a PDN GW (Packet Data Network Gateway, packet data network gateway, abbreviated as PGW); an SPR (Subscriber Profile Repository, subscriber profile repository) mainly includes subscription information required for implementing PCC rules in the PCRF; an OFCS (Offline Charging System, offline charging system) mainly implements an offline charging function, which may also be referred to as non real-time charging (non real-time charging) or referred to as post-paid (post-paid); and an OCS (Online Charging system, online charging system) mainly implements an online charging function, which may also be referred to as real-time charging (real-time charging) or referred to as pre-paid (pre-paid).

Figure 6:
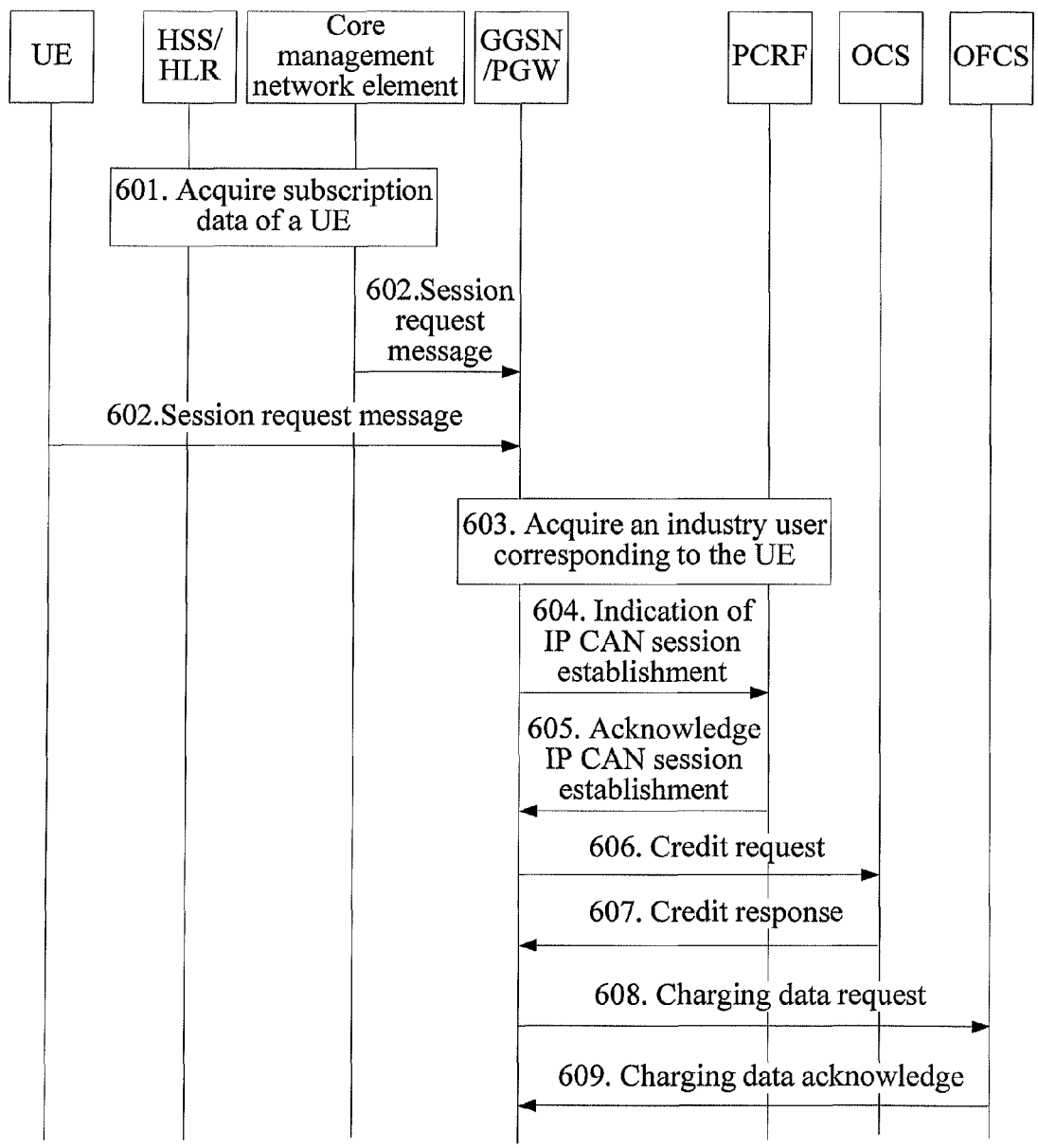
FIG. 6 is a flow chart of information exchange by using a method according to an embodiment of the present invention.

FIG. 6 is a flow chart of information exchange of a GGSN/PGW and other network elements under PCC architecture using the method of this embodiment. As shown in FIG. 6, the process includes:

601: A core management network element acquires subscription information of a UE from an HSS or an HLR, where the subscription information includes APN information used by the UE.

For a GERAN/UTRAN network, the core management network element is an SGSN; for an E-UTRAN network, the core management network element is an MME; for a WLAN network, the core management network element is an evolved packet data gateway (EPDG, Evolved Packet Data Gateway); for a Wimax network, the core management network element is an access service network gateway (Access Service Network Gateway, ASN GW); for a CDMA network, the core management network element is an access gateway (Access Gateway, AGW); and for an HRPD network, the core management network element is an HRPD serving gateway (HSGW, HRPD Serving Gateway). For example, in an attach process initiated by a user or a TAU process, the core management network element acquires the subscription information of the UE from the HSS or the HLR.

602: The core management network element sends a session request message to a GGSN/PGW, where the session request message carries a UE identifier and the APN information used by the UE.

Alternatively, the UE sends a session request message to the GGSN/PGW, where the session request message carries the UE identifier and the APN information used by the UE.

The session request message sent by the core management network element may be, for example, a create session request (Create Session Request) message, a create PDP context request (Create PDP Context Request) message, or a proxy binding update (Proxy Binding Update) message.

The session request message sent by the UE may be, for example, a binding update (Binding Update) message.

603: The GGSN/PGW acquires an industry user corresponding to the UE according to the UE identifier or the APN information used by the UE that is received from the core management network element or from the UE.

The method for acquiring the industry user corresponding to the UE is described above, and is not further repeated herein again.

604: The GGSN/PGW sends an indication of IP CAN session establishment (Indication of IP CAN Session Establishment) message to a PCRF, where the message carries an acquired industry user identifier. Optionally, the message may also carry the UE identifier.

605: The PCRF sends, according to the industry user identifier, a charging rule corresponding to the industry user to the GGSN/PGW through an acknowledge CAN session establishment (Acknowledge IP CAN Session Establishment) message.

The charging rule includes a charging identifier used by the industry user, for example, a charging key (Charging Key) or a charging identifier (Charging Identifier), a charging method (Charging method) used by the industry user such as online charging or offline charging, or a charging measurement method (Measurement method) of the industry user such as volume (Volume) count or duration (Duration) count. The industry user includes the granularity of the industry user, the bearer granularity of the industry user, or the flow granularity of the industry user, that is, PCC rule granularity, and the same is applicable elsewhere in this embodiment.

If the indication of IP CAN session establishment message received by the PCRF further carries the UE identifier, the PCRF may further generate, for the UE, a charging identifier used by the UE, and the PCRF notifies the GGSN/PGW of the charging identifier used by the UE.

The charging identifier of the industry user is transmitted to a charging system, and the charging system performs charging processing on the industry user according to the charging identifier (for example, the charging system correlates charging bills according to the charging identifier, that is, if the charging system receives two or more charging bills (such as, CDR) and if the charging system finds that the charging identifiers in the charging bills are the same, the charging system considers that the charging bills are correlated, and the charging system combines the charging bills). The charging identifier used by the UE may be transmitted to other systems, for example, a legal monitoring system, and the other systems perform class processing on the UE according to the charging identifier. Through the separate processing according to the two charging identifiers, the charging processing on the industry user in the charging system is implemented, but the processing effect of other systems is not influenced.

606 and 607: If the charging method used by the industry user is a charging method of online charging, the GGSN/PGW sends a credit request (Credit Request) message or an online charging request (Online Charging Request) message to the charging system such as OCS to request credit, where the message carries the acquired industry user identifier and charging identifier used by the industry user. The charging system sends credit information of the industry user to the GGSN/PGW through a credit response (Credit Response) message or an online charging response (Online Charging Response) message. Subsequently, in performing charging count, the GGSN/PGW counts charging information of the industry user, for example, if the charging count method of the industry user is volume count, counts volume used by each UE of the industry user, and the GGSN/PGW combines the volumes used by each UE (that is, adds up the volumes used by each UE), so as to generate volume information (that is, counted charging information of the industry user) used by the industry user; or if the charging count method of the industry user is duration count, duration used by each UE of the industry user is counted, and the GGSN/PGW combines the durations used by each UE (that is, adds up the durations used by each UE), so as to generate duration information used by the industry user (that is, counted charging information of the industry user). If the counted charging information of the industry user, such as volume and duration, reaches a credit threshold (threshold), the GGSN/PGW re-sends a Credit Request message or an Online Charging Request message to the charging system for acquiring credit, where the message carries the charging identifier used by the industry user, and the charging information of the industry user.

608 and 609: If the charging method used by the industry user is a charging method of offline charging, in performing charging count, the GGSN/PGW counts charging information of the industry user. For example, if the charging count method of the industry user is volume count, count volume used by each UE of the industry user, and the GGSN/PGW combines the volume used by each UE (that is, adds up the volume used by each UE), so as to generate volume information used by the industry user (that is, counted charging information of the industry user); or if the charging count method of the industry user is duration count, count duration used by each UE of the industry user, and the GGSN/PGW combines the duration used by each UE (that is, adds up the duration used by each UE), so as to generate duration information used by the industry user (that is, counted charging information of the industry user). The GGSN/PGW notifies the counted charging information of the industry user to a charging system, such as OFCS, through a message such as a data record transfer request (Data Record Transfer Request), a charging data request (Charging Data Request) or an accounting request (Accounting Request), where the message includes the industry user identifier, the charging identifier used by the industry user, and the counted charging information. The GGSN/PGW may also generate a CDR for the granularity of the industry user, the bearer granularity of the industry user, or the flow granularity of the industry user, where the CDR includes the industry user identifier, the charging identifier used by the industry user, and the counted charging information. The GGSN/PGW notifies the CDR to the charging system.

The embodiment shown in FIG. 6 is the method of this embodiment used by the GGSN/PGW, which is described by using a dynamic PCC mechanism for charging processing as an example, and if a non-PCC mechanism or a predefined (predefined) PCC mechanism which is also referred to as static PCC mechanism is used, in steps 604-605, the GGSN/PGW employs the following processing manners.

The GGSN/GW is configured with a charging rule of the industry user, and generate, for the industry user, a charging identifier used by the industry user. Optionally, the GGSN/PGW generates, for each UE, a charging identifier used by the UE. The charging rule includes, for example, a charging method used by the industry user, and a charging count method of the industry user. The industry user includes the granularity of the industry user, the bearer granularity of the industry user, or the flow granularity of the industry user, that is, PCC rule granularity, and the same is applicable elsewhere in this embodiment.

The GGSN/PGW sends the charging identifier of the industry user to a charging system, and the charging system performs charging processing on the industry user according to the charging identifier. The charging identifier used by the UE may be sent to other systems, for example, a legal monitoring system, and the other systems perform class processing on the UE according to the charging identifier used by the UE. Through the separate processing according to the two charging identifiers, the charging processing on the industry user in the charging system is implemented, but the processing effect of other systems is not influenced.

In this embodiment, the industry user includes the granularity of the industry user, the bearer granularity of the industry user, or the flow granularity of the industry user, that is, PCC rule granularity.

Through the charging count method provided in this embodiment of the present invention, the processing load of the GGSN/PGW is greatly reduced, so as to ensure the normal operation of the GGSN/PGW. Furthermore, the charging count information based on the industry user is sent to the charging system, so that the processing load of the charging system is greatly reduced, and the charging signaling volume between the GGSN/PGW and the charging system is also reduced. Moreover, the operator can implement the charging processing based on the granularity of the industry user, the bearer granularity of the industry user, or the flow granularity of the industry user only by upgrading the GGSN/PGW devices in the present network or the GGSN/PGW used by the deployed industry user, thereby greatly reducing the investment of the operator, and effectively protecting the investment of the operator.

Embodiment 3

An embodiment of the present invention further provides a charging count device, and this embodiment is described in detail below with reference to accompanying drawings.

Figure 7:
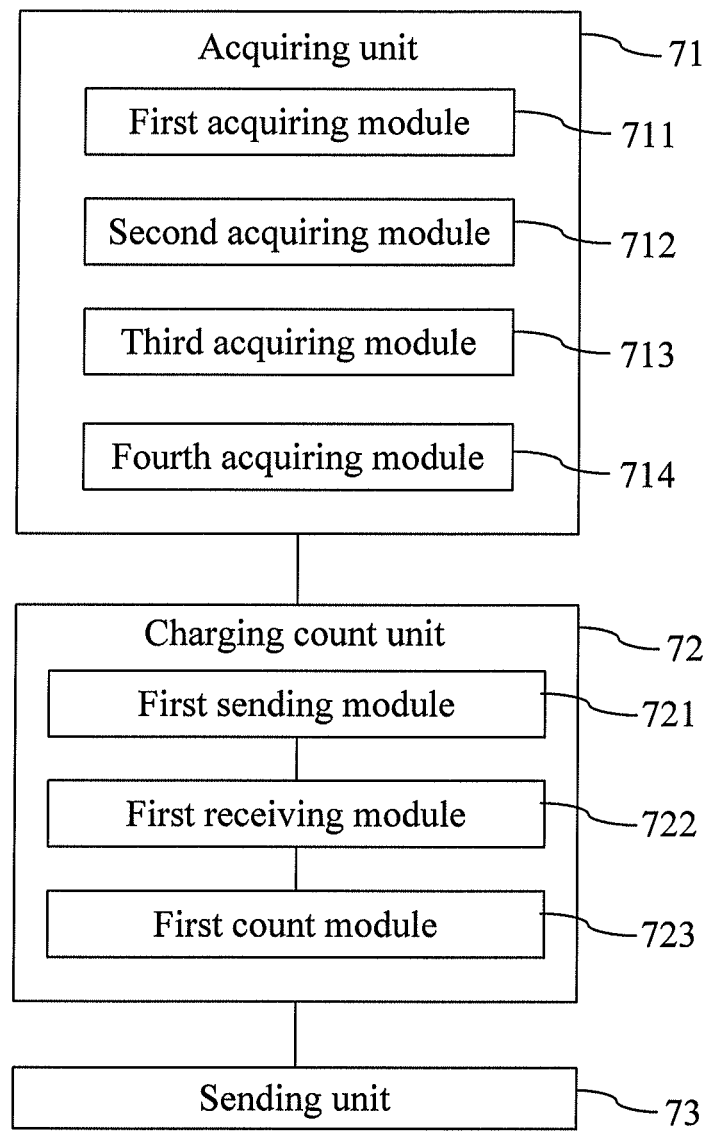
FIG. 7 is a schematic structural diagram of a device according to an embodiment of the present invention.
Figure 8:
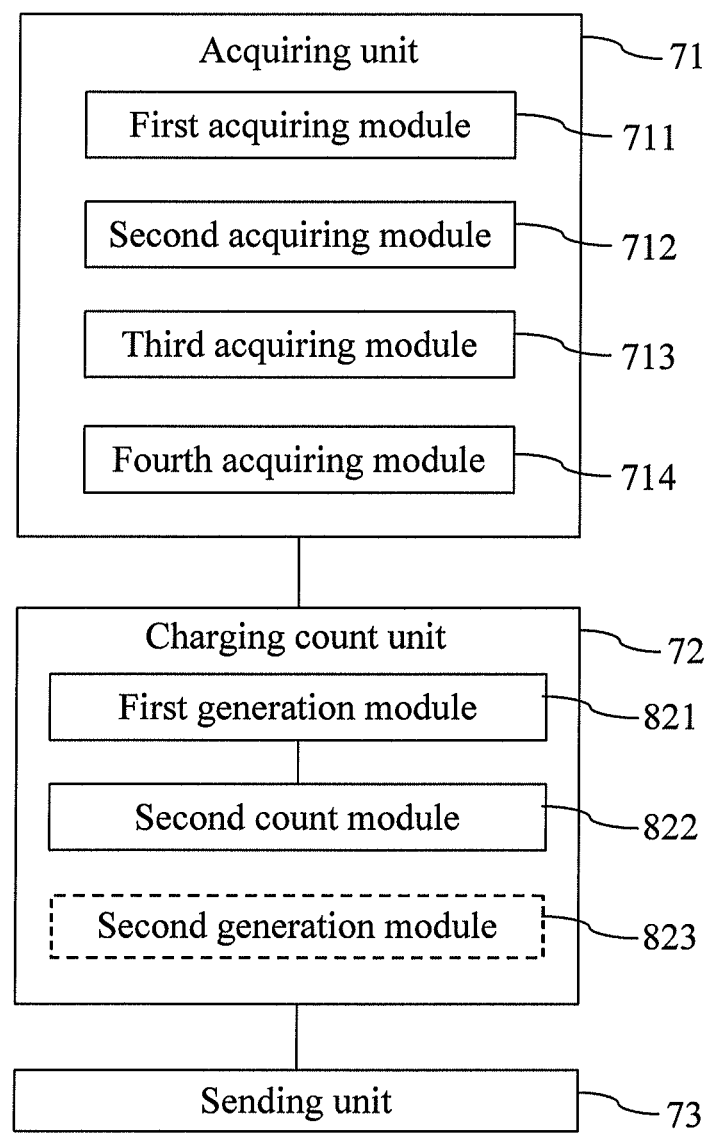
FIG. 8 is a schematic structural diagram of another device according to an embodiment of the present invention.

FIG. 7 and FIG. 8 are block diagrams of a structure of the device according to this embodiment. As shown in FIG. 7 and FIG. 8, the charging count device according to this embodiment includes:

an acquiring unit 71, configured to acquire an industry user identifier corresponding to a UE according to a UE identifier or an access point name APN used by the UE; and a charging count unit 72, configured to perform charging count on an industry user corresponding to the industry user identifier.

According to an implementation of this embodiment, the acquiring unit 71 may include:

a first acquiring module 711, configured to acquire the industry user identifier corresponding to the UE identifier according to the received UE identifier and a configured corresponding relation between the UE and the industry user; or a second acquiring module 712, configured to acquire the industry user identifier corresponding to the UE identifier according to the received UE identifier and a configured UE list used by the industry user; or a third acquiring module 713, configured to acquire the industry user identifier corresponding to the UE identifier according to the received UE identifier and the industry user corresponding to a configured UE identifier segment which is allocated to the industry user for use; or a fourth acquiring module 714, configured to acquire the industry user identifier corresponding to the UE according to the received APN used by the UE and a configured corresponding relation between the APN and the industry user.

According to an implementation of this embodiment, as shown in FIG. 7, the charging count unit 72 may include:

a first sending module 721, configured to send the acquired industry user identifier to a policy and charging enforcement function PCRF;

a first receiving module 722, configured to receive a charging rule of the industry user determined by the PCRF according to the industry user identifier; and a first count module 723, configured to perform charging count on the industry user according to the charging rule;

where:

the first sending module 721 may further send the received UE identifier to the PCRF at the same time when sending the acquired industry user identifier to the policy and charging enforcement function PCRF; and the first receiving module 722 may further receive a charging identifier used by the UE and generated by the PCRF according to the UE identifier at the same time when receiving the charging rule of the industry user determined by the PCRF according to the industry user identifier;

where:

the first count module 723 is configured to perform volume charging count on the UEs of the industry user when a count mode of the charging rule is volume count, combine volume charging information of the UEs, and generate volume charging information of the industry user; or perform duration charging count on the UEs of the industry user when a count mode of the charging rule is duration count, combine duration charging information of the UEs, and generate duration charging information of the industry user.

Furthermore:

the first count module 723 is further configured to send the volume charging information or the duration charging information of the industry user to an OCS when a count method of the charging rule is online charging; or send the volume charging information or the duration charging information of the industry user to an OFCS when a count method of the charging rule is offline charging, where a message sent to the OCS or the OFCS includes a charging identifier of the charging rule.

According to another implementation of this embodiment, as shown in FIG. 8, the charging count unit 72 may include:

a first generation module 821, configured to generate a charging identifier of the industry user; and a second count module 822, configured to perform charging count on the industry user according to the charging identifier of the industry user and the configured charging rule of the industry user.

In this implementation, the charging count unit 72 may further include:

a second generation module 823, configured to generate the charging identifier of the UE;

where:

the second count module 822 is configured to perform volume charging count on the UEs of the industry user when a count mode of the charging rule is volume count, combine volume charging information of the UEs, and generate volume charging information of the industry user; or perform duration charging count on the UEs of the industry user when a count mode of the charging rule is duration count, combine duration charging information of the UEs, and generate duration charging information of the industry user.

Furthermore:

the second generation module 822 is further configured to send the volume charging information or the duration charging information of the industry user to an OCS when a charging method of the charging rule is online charging; or send the volume charging information or the duration charging information of the industry user to an OFCS when a charging method of the charging rule is offline charging, where a message sent to the OCS or the OFCS includes a charging identifier of the charging rule.

Each component unit of the charging count device according to this embodiment is respectively configured to implement the functions of the steps in the method according to Embodiment 2, and the details are not repeated herein again since the steps have been described in detail in Embodiment 2.

In the implementation shown in FIG. 7 or FIG. 8, the device may further include:

a sending unit 73, configured to send the charging count information to the charging system.

The charging count device according to this embodiment may be contained in a charging count network element GGSN or PGW.

Through the charging count device provided in this embodiment, the charging processing load in the charging count network element is greatly reduced, so as to ensure the normal operation of the charging count network element. Furthermore, the charging count information based on the industry user is sent to the charging system, so that the processing of charging signaling between the GGSN/PGW and the charging system is optimized, thereby greatly reducing the processing load of the charging system and the GGSN/PGW, and the operator can implement the charging processing based on the granularity of the industry user, the bearer granularity of the industry user, or the flow granularity of the industry user only by upgrading the GGSN/PGW devices in the present network or the GGSN/PGW used by the deployed industry user, thereby greatly reducing the investment of the operator, and effectively protecting the investment of the operator.

Steps of the method or algorithm described with reference to embodiments disclosed herein may be implemented directly through hardware, a software module executed by a processor, or a combination thereof. The software module may be positioned in a random access memory (RAM), an internal memory, a read-only memory (ROM), an electrically programmable ROM, electrically-erasable programmable ROM, a register, a hard disk, a removable hard disk, a CD-ROM, or any other form of storage media well known in the art.

The objectives, technical solutions, and beneficial effects of the present invention have been described in further detail through the above specific embodiments. It should be understood that the above descriptions are merely specific embodiments of the present invention, but not intended to limit the present invention. Any modification, equivalent replacement, or improvement made without departing from the spirit and principle of the present invention should fall within the protection scope of the present invention.

What is claimed is:

1. A charging count method, comprising executing operations by at least a processor in a Gateway GPRS (General Packet Radio Service) Support Node or a Packet Data Network Gateway (GGSN/PDW), the operations comprising:

the GGSN/PDW acquiring from a user equipment or a core management network element, an industry user identifier, wherein the industry user identifier corresponds to the user equipment, and the acquiring of the industry user identifier is according to receiving one of: a user equipment identifier which corresponds to the user equipment or an access point name (APN) which is used by the user equipment, wherein the acquiring of the industry user identifier according to the access point name (APN) which is used by the user equipment, comprises:

acquiring the industry user identifier corresponding to the user equipment according to the received APN which is used by the user equipment and a corresponding configured relation between the APN and the industry user; and performing by the GGSN/PDW, charging count on an industry user which corresponds to the acquired industry user identifier, wherein the performing of the charging count on the industry user corresponding to the industry user identifier comprises:

sending the acquired industry user identifier to a policy control and charging rules function (PCRF);

receiving a charging rule of the industry user determined by the PCRF according to the industry user identifier; and performing the charging count on the industry user according to the charging rule.

2. The method according to claim 1, wherein the acquiring of the industry user identifier which utilizes the user equipment identifier comprises one of:

acquiring the industry user identifier corresponding to the user equipment identifier according to the received user equipment identifier and a corresponding configured relation between the user equipment and the industry user;

acquiring the industry user identifier corresponding to the user equipment identifier according to the received user equipment identifier and a configured user equipment list utilized by the industry user; and acquiring the industry user identifier corresponding to the user equipment identifier according to the received user equipment identifier and the industry user which corresponds to a configured user equipment identifier segment, wherein the configured user equipment identifier segment is allocated to be utilized by the industry user.

3. The method according to claim 1, wherein the charging rule of the industry user comprises one or more of:
a charging identifier used by the industry user;
a charging method of the industry user; and
a count mode of the industry user.

4. The method according to claim 1, wherein the performing the charging count on the industry user corresponding to the industry user identifier comprises:
generating a charging identifier of the industry user; and
performing the charging count on the industry user according to the charging identifier of the industry user and a configured charging rule of the industry user.

5. The method according to claim 4, wherein the performing the charging count on the industry user comprises:
performing volume charging count on user equipments of the industry user, combining volume charging information of the user equipments, and generating volume charging information of the industry user, wherein a count mode of the charging rule is volume count; or
performing duration charging count on user equipments of the industry user, combining duration charging information of the user equipments, and generating duration charging information of the industry user, wherein a count mode of the charging rule is duration count.

6. The method according to claim 5, wherein the performing the charging count on the industry user further comprises:
sending the volume charging information or the duration charging information of the industry user to an online charging system, wherein a charging method of the charging rule is online charging and a message sent to the oneline charging system comprises the charging identifier of the charging rule; or
sending the volume charging information or the duration charging information of the industry user to an offline charging system, wherein a charging method of the charging rule is offline charging and a message sent to the offline charging system comprises the charging identifier of the charging rule.

7. The method according to claim 1, wherein the performing the charging count on the industry user comprises:
performing volume charging count on user equipments of the industry user, combining volume charging information of the user equipments, and generating volume charging information of the industry user, wherein a count mode of the charging rule is volume count; or
performing duration charging count on user equipments of the industry user, combining duration charging information of the user equipments, and generating duration charging information of the industry user, wherein a count mode of the charging rule is duration count.

8. The method according to claim 7, wherein the performing the charging count on the industry user further comprises:
sending the volume charging information or the duration charging information of the industry user to an online charging system, wherein a charging method of the charging rule is online charging and a message sent to the oneline charging system comprises the charging identifier of the charging rule; or
sending the volume charging information or the duration charging information of the industry user to an offline charging system, wherein a charging method of the charging rule is offline charging and a message sent to the offline charging system comprises the charging identifier of the charging rule.

9. The method according to claim 1, wherein after the performing the charging count on the industry user corresponding to the industry user identifier, the method further comprises:
sending charging count information to a charging system; wherein the charging count information comprises:
the industry user identifier, a charging identifier used by the industry user, and charging information of the industry user; or
a charging identifier used by the industry user, and the charging information of the industry user.

10. A charging count device in the GGSN/PDW, comprising a processor coupled to a memory storing algorithms, wherein the algorithms when executed by the processor, configure the charging count device to:
acquire from a user equipment or a core management network element an industry user identifier, wherein the industry user identifier corresponds to the user equipment, and the acquiring of the industry user identifier is according to receiving one of: a user equipment identifier which corresponds to the user equipment or an access point name (APN) which is used by the user equipment, wherein the acquiring of the industry user identifier according to the access point name (APN) which is used by the user equipment, comprises:
acquiring the industry user identifier corresponding to the user equipment according to the received APN which is used by the user equipment and a corresponding configured relation between the APN and the industry user; and
perform charging count on an industry user which corresponds to the acquired industry user identifier, wherein the performing of the charging count on the industry user corresponding to the industry user identifier comprises:
sending the acquired industry user identifier to a policy control and charging rules function (PCRF);
receiving a charging rule of the industry user determined by the PCRF according to the industry user identifier; and
performing the charging count on the industry user according to the charging rule.

11. The device according to claim 10, wherein the charging count device in the GGSN/PDW is further configured to perform one of:
acquire the industry user identifier corresponding to the user equipment identifier according to the received user equipment identifier and a corresponding configured relation between the user equipment and the industry user;
acquire the industry user identifier corresponding to the user equipment identifier according to the received user equipment identifier and a configured user equipment list utilized by the industry user; and
acquire the industry user identifier corresponding to the user equipment identifier according to the received user equipment identifier and the industry user which corresponds to a configured user equipment identifier segment, wherein the configured user equipment identifier segment is allocated to be utilized by the industry user.

12. The device according to claim 10, wherein the charging count unit device in the GGSN/PDW is further configured to:
generate a charging identifier of the industry user; and
perform the charging count on the industry user according to the charging identifier of the industry user and a configured charging rule of the industry user.

13. The device according to claim 12, wherein the charging count device in the GGSN/PDW is further configured to:

perform volume charging count on user equipments of the industry user when a count mode of the charging rule is volume count, combine volume charging information of the user equipments, and generate volume charging information of the industry user; or perform duration charging count on user equipments of the industry user when a count mode of the charging rule is duration count, combine duration charging information of the user equipments, and generate duration charging information of the industry user.

14. The device according to claim 13, wherein the charging count device in the GGSN/PDW is further configured to:
    send the volume charging information or the duration charging information of the industry user to an online charging system when a charging method of the charging rule is online charging; or
    send the volume charging information or the duration charging information of the industry user to an offline charging system when a charging method of the charging rule is offline charging, wherein the message sent to the online charging system or the offline charging system comprises the charging identifier of the charging rule.

15. The device according to claim 10, wherein the charging count device in the GGSN/PDW is further configured to:
    perform volume charging count on user equipments of the industry user when a count mode of the charging rule is volume count, combine volume charging information of the user equipments, and generate volume charging information of the industry user; or
    perform duration charging count on user equipments of the industry user when a count mode of the charging rule is duration count, combine duration charging information of the user equipments, and generate duration charging information of the industry user.

16. The device according to claim 15, wherein the charging count device in the GGSN/PDW is further configured to:
    send the volume charging information or the duration charging information of the industry user to an online charging system when a charging method of the charging rule is online charging, wherein a message sent to the online charging system comprises the charging identifier of the charging rule; or
    send the volume charging information or the duration charging information of the industry user to an offline charging system when a charging method of the charging rule is offline charging, wherein a message sent to the offline charging system comprises the charging identifier of the charging rule.

17. The device according to claim 10, wherein the charging count device in the GGSN/PDW is further configured to:
    send charging count information to a charging system.

* * * * *